United States Patent [19]

Hulin et al.

[11] 4,272,472
[45] Jun. 9, 1981

[54] METHOD AND APPARATUS FOR GROOVED SECTION MANUFACTURE

[75] Inventors: Jean P. Hulin, Conflans; Michel de Vecchis, Pontoise, both of France

[73] Assignee: Societe Lignes Telegraphiques et Telephoniques, Paris, France

[21] Appl. No.: 90,993

[22] Filed: Nov. 5, 1979

[30] Foreign Application Priority Data

Nov. 17, 1978 [FR] France .................................. 78 32530

[51] Int. Cl.³ .......................... B29C 17/16; G02B 5/14
[52] U.S. Cl. ...................................... 264/146; 264/1.1; 264/163; 264/173; 264/174; 264/209.1; 264/310; 425/113; 425/307; 425/309; 425/313; 425/315; 425/380; 425/467
[58] Field of Search ................... 264/146, 145, 1, 149, 264/150, 151, 163, 159, 310, 177 R, 209, 174, 173; 425/307–308, 309, 313, 314–315, 380, 316, 464, 467, 113, 114

[56] References Cited

U.S. PATENT DOCUMENTS

| | | | |
|---|---|---|---|
| 1,405,998 | 2/1922 | Gammeter | 264/146 |
| 2,096,347 | 10/1937 | Short | 425/113 |
| 2,176,233 | 10/1939 | Wermine | 264/174 |
| 3,778,217 | 12/1973 | Bustamante et al. | 425/467 |
| 4,155,963 | 5/1979 | de Vecchis et al. | 264/174 |

*Primary Examiner*—Jeffery R. Thurlow
*Attorney, Agent, or Firm*—Robert A. Ostmann

[57] ABSTRACT

A process and tooling to carry on said process for producing direct from extrusion an open groove plastic cylindrical section which consists in extruding the material around cylindrical pins arranged along a circle and protruding downstream with respect with the die opening and drawing the deformable structure along inner cutters located in the ducts formed by the pins to cut the material between the duct and the outside and further drawing said still deformable structure around flexible wires free to fill said slitted ducts.

4 Claims, 5 Drawing Figures

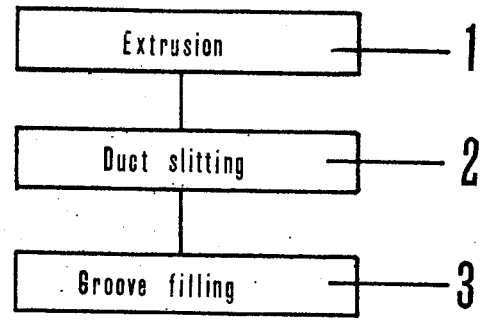
Fig.1
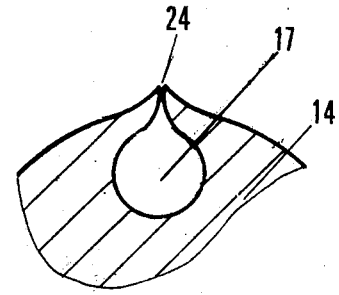
Fig.5
FIG. 5b
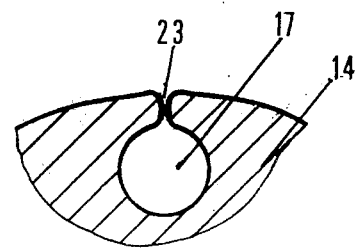
FIG. 5a

METHOD AND APPARATUS FOR GROOVED SECTION MANUFACTURE

BACKGROUND OF THE INVENTION

This invention relates to an improved method of fabrication of cylindrical grooved sections provided with longitudinal recesses or with helical recesses with either a direct or alternate pitch, said recesses being almost closed with peripheral opposing lips which come into contact with each other. A structure of this type is primarily intended to be employed as a support for optical fiber communication cables such as, for instance described in U.S. patent Application Ser. No. 877,872 filed on Feb. 15, 1978 entitled: "Cable incorporating optical fibers".

The U.S. patent Application Ser. No. 797 filed on Jan. 3, 1979 entitled: "Method of continuously machining supports for electromagnetic waves guides" discloses a method for the continuous machining of grooves in a solid cylindrical section by removal of material. This operation is carried out by means of a machining head which is designed for rotating about the axis of the cylinder and comprises tools for cutting said grooves. The method thus described is limited to the fabrication of grooved sections having outwardly open grooves.

The object of the present invention is to form lipped recesses in a grooved section during the extrusion operation without any reduction in the linear extrusion speed and without further machining step.

SUMMARY OF THE INVENTION

The method in accordance with the invention is essentially based on the fact that said grooved section is obtained by extrusion through a cross head extruder comprising a molten material guide which is provided with a series of rigid longitudinal protruding pins disposed at intervals on a circumference which is concentric with the cross-section of the section to be extruded and is smaller in diameter than the opening of the extruder die. Said rigid longitudinal pins form extensions of the molten material guide in the downstream direction further than the extruder die. They are associated at the ends remote from said guide with one or a number of means for cutting the extruded material located between the section external surface limited by the die and the inner ducts provided by said longitudinal pins. Flexible means are also associated with said pins in order to preserve the shape of the ducts until the extruded material has hardened.

In a first alternative embodiment, the longitudinal pins are adapted to carry bent back wires which are attached at one end to the pins whilst the other ends are attached to a ring disposed concentrically with the die head. The ring diameter is greater than that of the die, and it is located upstream of said die; cutting of the extruded material in this embodiment is effected by the back-bent wires. The shape of each duct is preserved by means of a second flexible wire connected to each pin end having one free end and disposed parallel to the curved wire at the upstream end of the shaped wires.

In a second alternative embodiment, said longitudinal pins consist of protruding pins which are secured at the upstream end to the guide whilst the downstream end terminates in a knife having an outwardly directed cutting blade.

The formation of the grooves without removal of material after extrusion permits the formation of lips which practically closeback each groove and ensures effective protection of an optical fiber placed within the groove.

The formation of the lipped grooves within the cylindrical section defined by the extrusion die results in a cable structure which has relatively high strength and can be stored on a reel without any attendant hazard.

The other advantages of the method according to the present invention lie essentially in simplified manufacture of the grooved section since it ensures simultaneous formation of both recess and lips during the actual extrusion operation. Since any re-processing of the section is avoided, the method is particularly well suited to continuous production of a cable containing optical fibers when coupled to a fiberlaying station such as described in the U.S. patent application Ser. No. 16,385 filed on Mar. 1, 1979.

BRIEF DESCRIPTION OF THE DRAWINGS

A clear understanding of the invention will be gained from the following description and from the accompanying drawings which are given by way of illustration in which:

FIG. 1 shows the different steps of the method in accordance with the invention;

FIG. 5 shows fragmentary cross-sections of the grooved section fabricated by means of the method according to the invention.

DETAILED DESCRIPTION

Figure 2:
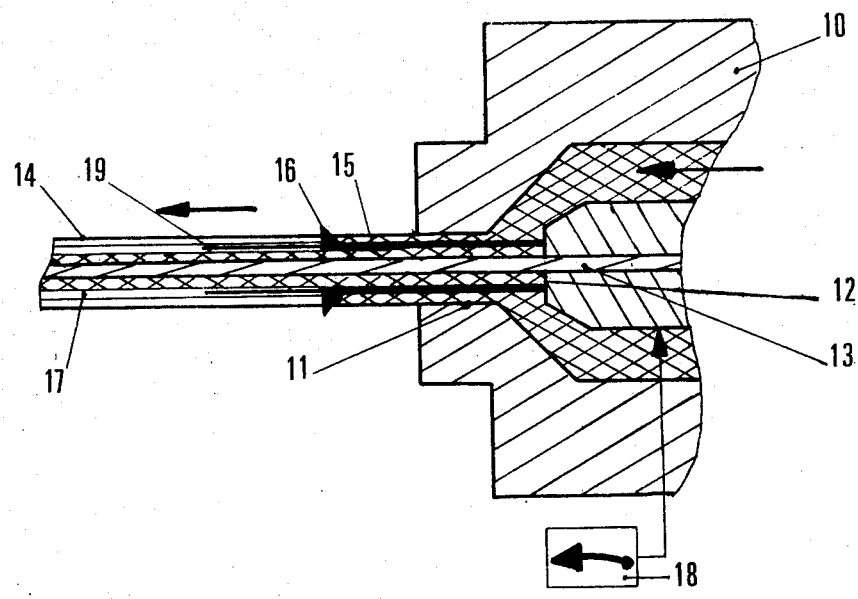
FIGS. 2, 3 and 4 are enlarged fragmentary views of the extruder head.

The method contemplated by the invention is a method for the direct extrusion of grooved sections having a cylindrical external shape and provided with longitudinal or helical grooves having either a simple or an alternate pitch. Said grooves are formed in spaced relation in the vicinity of the external surface of the cylinder and are almost closed at outer surface by two oppositely-facing lips directed towards each other. Grooved sections of this type are shown in cross-section in FIG. 5. The method in accordance with the invention essentially consists in having the molten plastic material injected through an inlet arranged at 90° to the section travel on an input cylindrical guide coaxial with the extruding die; the end of said guide facing the die is provided with a series of axial pins distributed along a circle the diameter of which is smaller than that of the die opening and protrudes downstream of said die; the section is drawn through the die around said pins which provide ducts within the section; the ducts are opened by outwardly directed cutting means fitted within the ducts; the ducts are filled until the section is hardened.

The extrusion operation is shown at 1 in FIG. 1. The inner ducts which have been delimited are each provided with a longitudinal slit which establishes a communication between the duct and the exterior of the grooved section. The duct slitting operation is shown at 2 in FIG. 1. This operation is carried out immediately at the exit of the extrusion die while the material is still in the deformable state. In order to prevent collapse of the ducts delimited at the extrusion, means are provided for filling said ducts over a length of the grooved section corresponding to a temperature drop which is sufficient to ensure that the shape of the grooved section is set (operation 3). As will be explained in greater detail hereinafter, said filling is performed by wires having a smaller diameter than the pins which have delimited the ducts, said wires being so arranged as to form extensions of said pins. To obtain helical ducts, means are provided for driving the molten material guide in rotation with respect to the stationary body of the extruder at an angular velocity which depends both on the rate of travel of the grooved section and on the required pitch value. Said pitch may be constant or adjustable or else it may be alternate in accordance with known practice. Filling the grooves with a flexible wire has the effect of preventing any deformation of said ducts as a result of tensile stresses exerted on the grooved section by a drawing unit and by rotation of this latter before the material has hardened. Outward opening of the grooves along an external director-line is performed by means rigidly fixed to the downstream end of the protruding pins which delimit the ducts. Experience has shown that the different operations performed on the grooved section at the moment of extrusion and immediately afterwards do not reduce the production speed of the extruder.

FIG. 2 illustrates to a large scale a first alternative embodiment of the in-line part of the extruder for the practical application of the method. The reference 10 designates the cross head extruder body which terminates in the extrusion die 11. There is shown at 12 the downstream end of the molten material guide in which is formed a central longitudinal bore for a stiffening core 13 which is intended to be incorporated within the grooved section 14 through the extrusion process. It should be clearly understood that the bore is not more than standard practice and is to be omitted if the grooved section is free of stiffening core. The direction of the material flow is represented by the arrow 20. The material is shown as cross-hatched. As shown in the figure, the end face of guide 12 is adapted to carry protruding pins 15 (only two of which are visible in the sectional view of FIG. 2). Said pins are disposed in spaced relation on a circumference which is slightly smaller than that of the opening of die 11. The length of said protruding pins is chosen so as to ensure that these latter project to a slight extent from the downstream face of the die 11. Each protruding pin terminates in a triangular knife 16 which forms an extension of said pin end. The blade or cutting edge of each knife is directed outwardly and the maximum diameter of said knives is greater than the diameter of the opening of the die 11. Said knives 16 have the function of cutting the thin film of material located between the duct which is delimited by the associated protruding pin 15 and the periphery of the grooved section. As shown in the figure, the grooved section 14 extruded around central core 13 comprises a thickness of extruded material which is set by the difference in radius of core 13 and opening of die 11. Grooves 17 as delimited by protruding pins 15 are provided at the periphery with openings in the form of slits cut by knives 16. The cross-section of a slitted duct or groove is illustrated to a larger scale in FIGS. 5. A unit for driving the guide 12 in rotation is shown diagrammatically at 18. Said drive unit proves necessary when it is desired to obtain helical grooves of either simple or alternate pitch. The knives 16 bear extensions in the form of flexible wires 19 which are engaged in the grooves 17 and serve to fill them in order to prevent choking as a result of collapse of the plastic material which is still in a relatively soft state as it comes out of the extruder. The length of said wires 19 is chosen as a function of the nature of the extruded material and of the extrusion speed. In the case of helical grooves or grooves having an alternate pitch, it is essential to ensure that the filling wires are flexible in order to prevent any deformation of the grooves as a result of forces produced by the rotation. Protruding pins 15 must be provided on the contrary with high rigidity as well as a surface state which is identical with that of the guide in order to ensure correct flow of the material.

Figure 3:
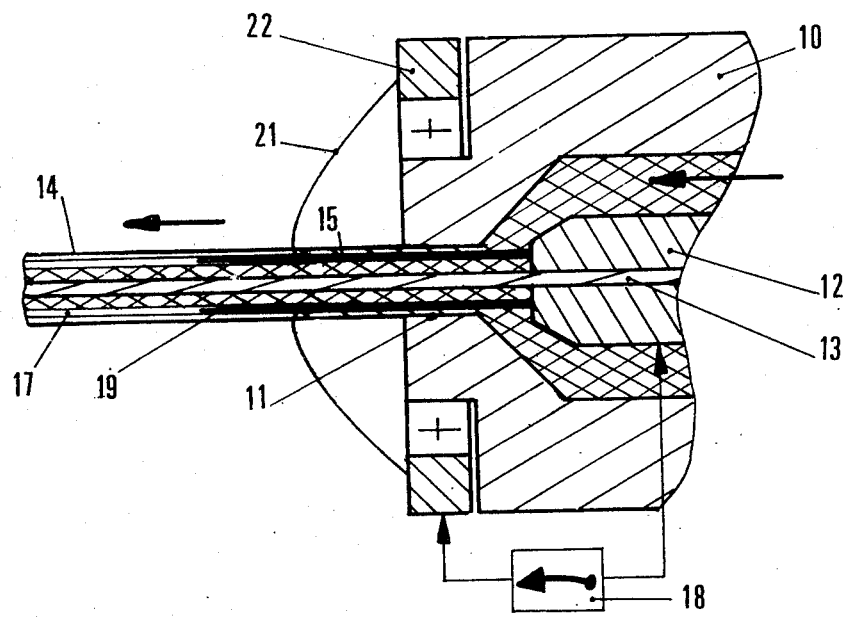

FIG. 3 illustrates a second alternative mode of execution. Elements which are identical with those of FIG. 2 are designated by the same reference numerals. In this alternative embodiment, provision is no longer made for knives 16 and slitting of the ducts is performed by means of wires 21 carried by the free end of each protruding pin 15. Said wires 21 are curved back towards the rear and secured to a ring 22 having a diameter which is distinctly greater than that of the opening of the die 11. In the case of helical grooves, ring 22 is driven in rotation in synchronism with the guide 12 as shown at 18. In the case of longitudinal grooves, the ring is fixed to the extrusion head. FIG. 5b is a fragmentary sectional view of the sectional strip thus obtained.

Figure 4:
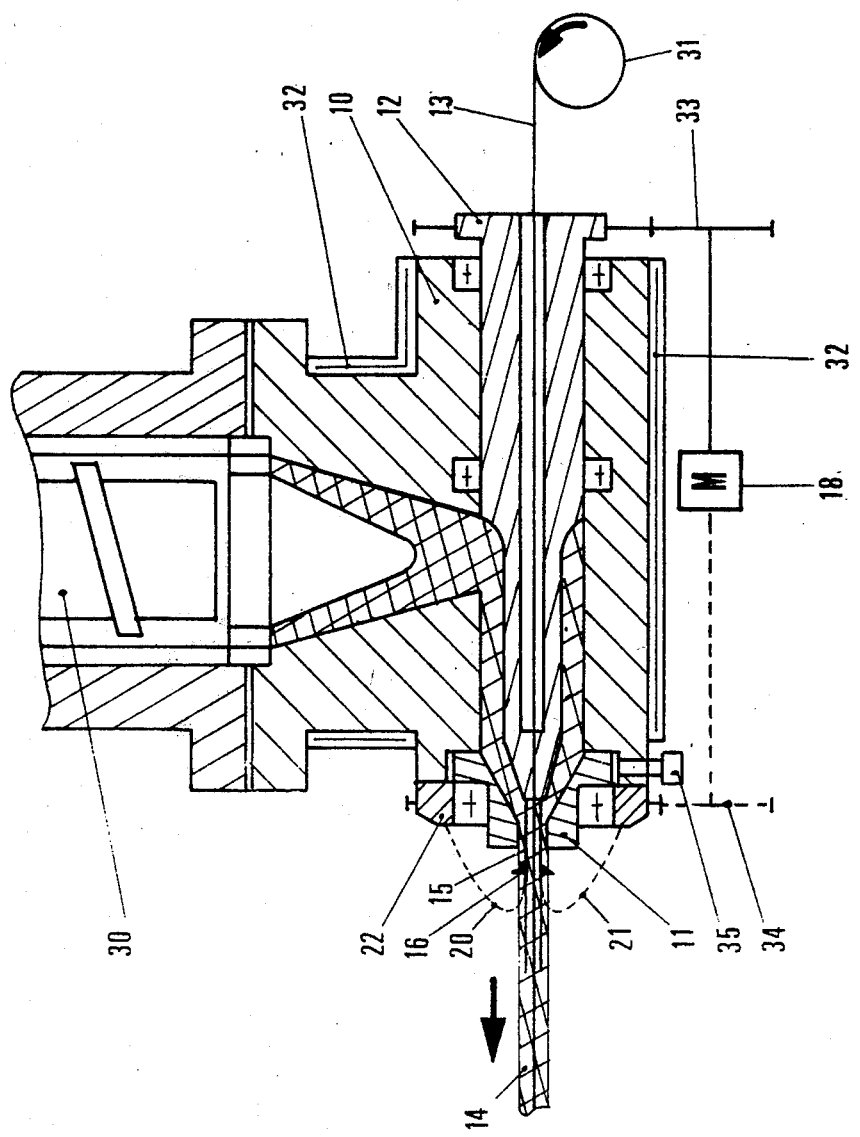

FIG. 4 is a sectional view of the head 10 of a cross-head extruder adapted to the practical application of the invention. Elements which are identical with those of the previous figures are designated by the same reference numerals. Reference 30 designates the feeding screw for supplying the molten plastic material which is intended to form the grooved section. Reference 31 designates the storage reel from which the stiffening central core 13 is supplied. It is readily apparent that said central core corresponds to a particular application and does not form part of the method. Heating resistors 32 serve to heat the plastic material which fills the entire space represented by the cross-hatched areas in the figure. The protuding pins which are arranged on the guide 12 are shown at 15 as well as the knives 16. The dashed line shows the alternative embodiment of FIG. 3 in which the duct slits are formed by wires 21 mounted back on ring 22. Motor 18 drives the section guide 12 (and the ring 22) in the case of helical grooves in rotation by means of gears 33 (and 34 respectively). The die-centering adjustment device which is provided on any extrusion machine is shown diagrammatically at 35.

FIGS. 5a and 5b are fragmentary section views of the grooved sections obtained by the production units shown respectively in FIGS. 2 and 3. Grooved section 14 is provided with grooves 17, only one of which is shown in each of FIGS. 5a and 5b. Thus it is apparent that the cross-section of the grooved section shown in FIG. 5a remains circular and that the cut made by the knife-blade 16 forms a radial slit 23 which establishes a communication between the groove and the exterior of said grooved section. On the contrary, the groove formed in the sectional strip of FIG. 5b has a pear-shaped deformation, the tail portion 24 of which is intented to be directed towards the periphery by reason of the fact that, in this embodiment, the deformation produced by the wire 21 is more progressive and opening of the groove results from pulling produced by said wire and not by cutting.

What we claim:

1. A process for manufacturing a grooved plastic section with open grooves direct from extrusion through a cross-head without further machining comprising the steps of:

extruding molten plastic material through a die opening coaxial with a central longitudinal guide located upstream with respect to said die, said guide carrying longitudinal pins distributed along a circle of diameter smaller than said die opening and extending downstream of said die so as to provide ducts within the extruded section;

drawing said extruded section across a series of outwardly directed cutting means disposed at the downstream ends of said pins to form radial slits leading from the ducts through the periphery of the extruded section; and further drawing said extruded section along guides which fill the ducts and extend downstream from the pins a distance sufficient to enable the guides to preserve the shapes of the ducts until the extruded material sets.

2. A process for manufacturing a grooved plastic section according to claim 1 in which said guide, and said cutting means are rotated with respect to the extruder body.

3. An apparatus for manufacturing a grooved plastic section with open grooves direct from extrusion without further machining which includes:

a cross-head extruder inlet forcing molten plastic material along an horizontal line;

a smooth horizontal cylindrical guide surrounded by said molten material;

protruding pins mounted on a circle on the downstream end of said guide to delimit ducts;

a die coaxial with said guide and downstream of said guide with an opening surrounding said pins for outwardly shaping said section;

cutting means made of triangular blades mounted on the downstream end of said pins opening slits in said ducts;

flexible wires mounted on the downstream ends of said pins to fill said slitted ducts.

4. An apparatus for manufacturing a grooved plastic section with open grooves direct from extrusion without further machining which includes:

a 90° extruder inlet forcing molten plastic material;

a smooth horizontal cylindrical guide surrounded by said molten material;

protruding pins mounted on a circle on the downstream end of said guide to delimit ducts in the section;

a die coaxial with said guide with an opening surrounding said pins to outwardly shape the extruded section;

rigid wires connected to the downstream ends of said pins curved back so that the second end of said wires is connected to a ring with a diameter larger than the die located upstream of said die to cut a slit in said duct;

flexible wires connected at the downstream end of said pins to fill the slitted ducts.

* * * * *